Inventor
Hans C. Paulsen
By his Attorney

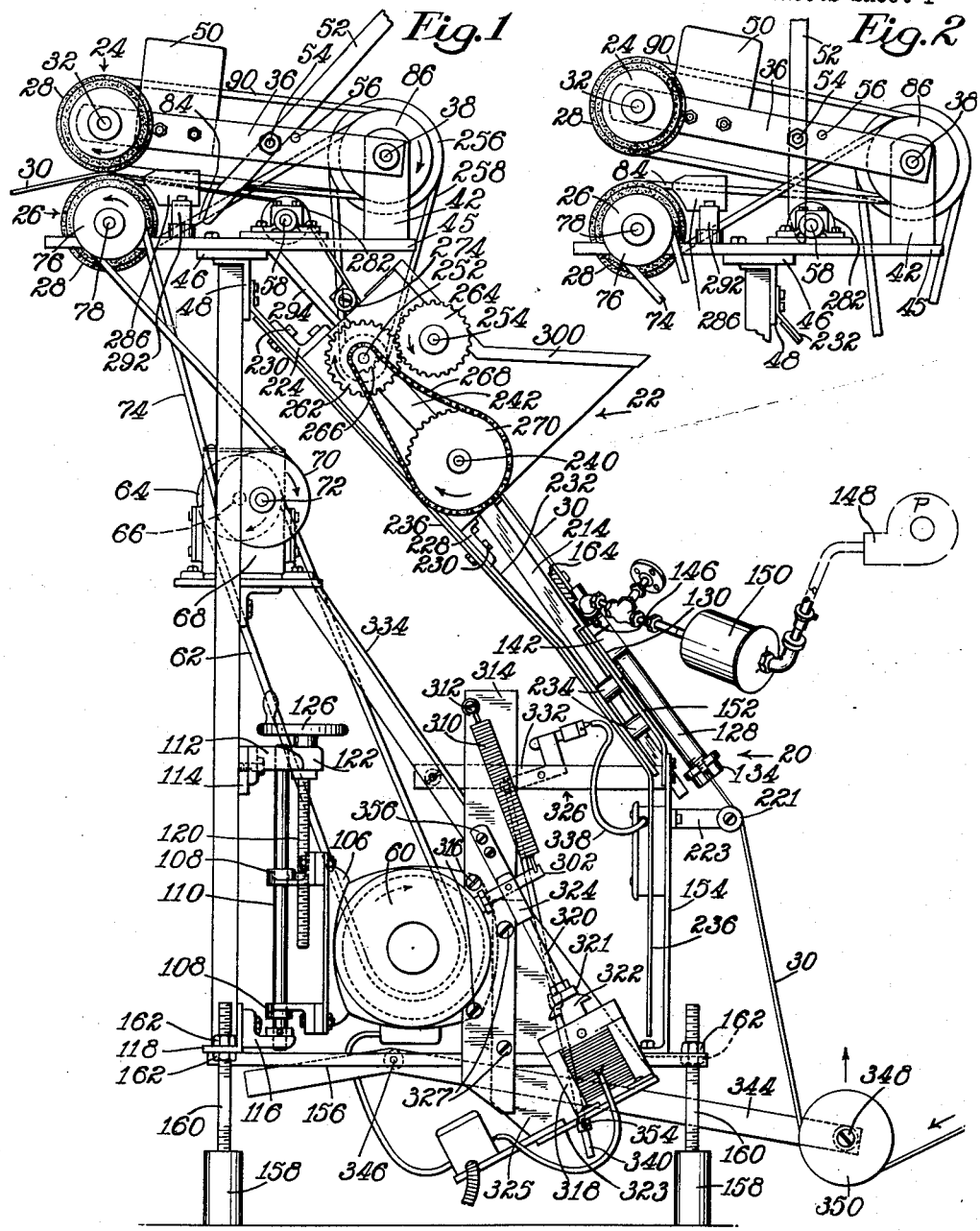

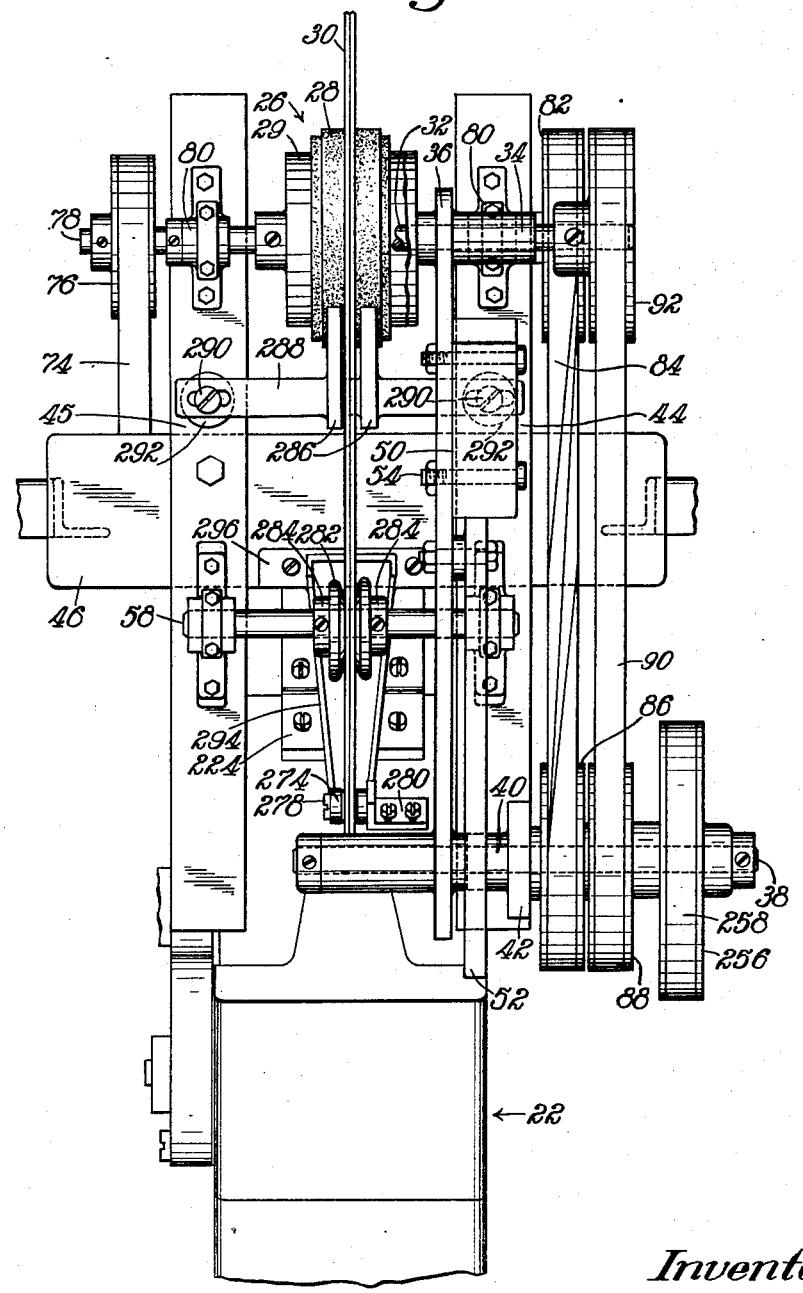

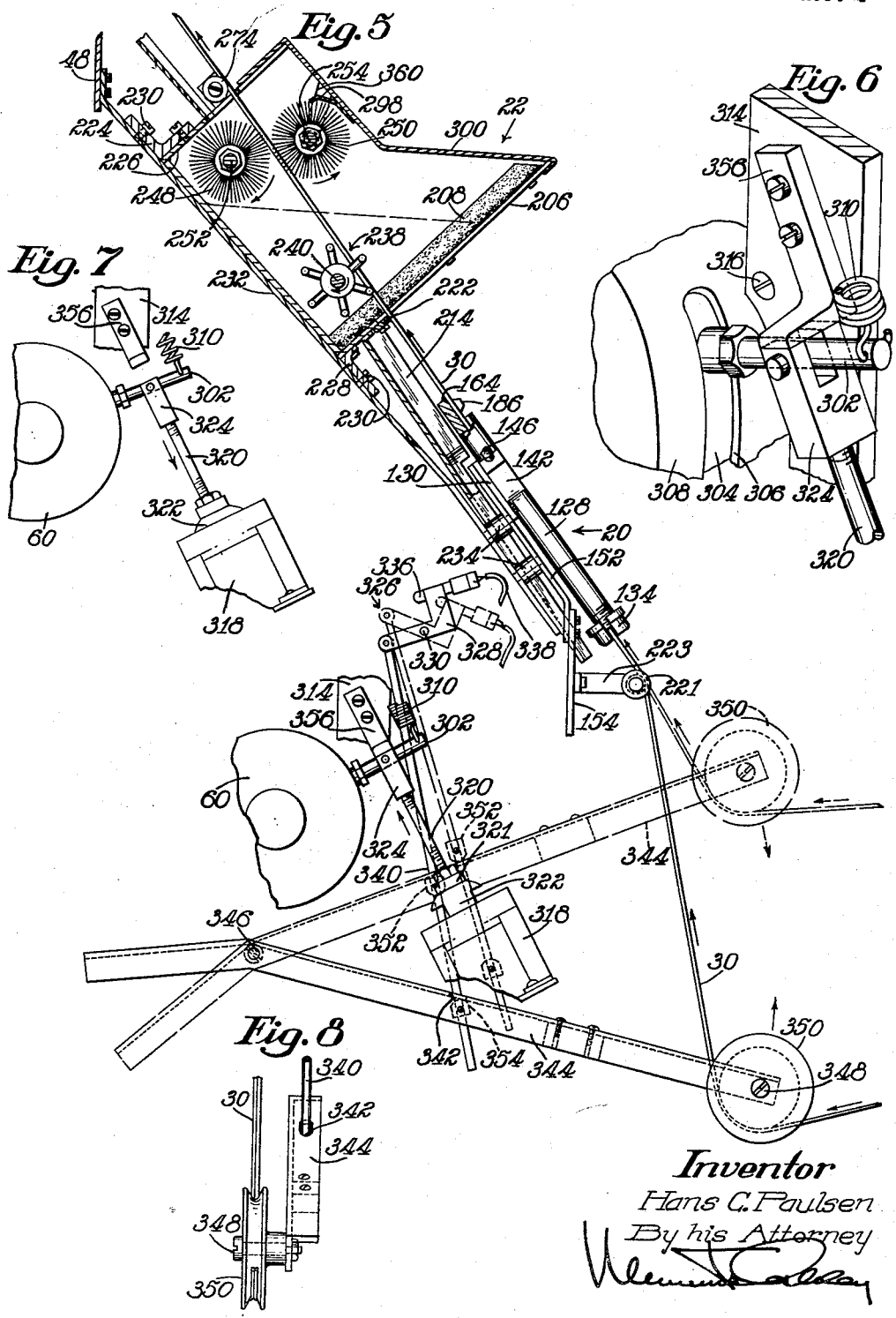

Nov. 29, 1960        H. C. PAULSEN        2,961,992
MEANS FOR COATING FLEXIBLE ROD SHAPED MATERIAL
Filed June 29, 1956                  6 Sheets-Sheet 5
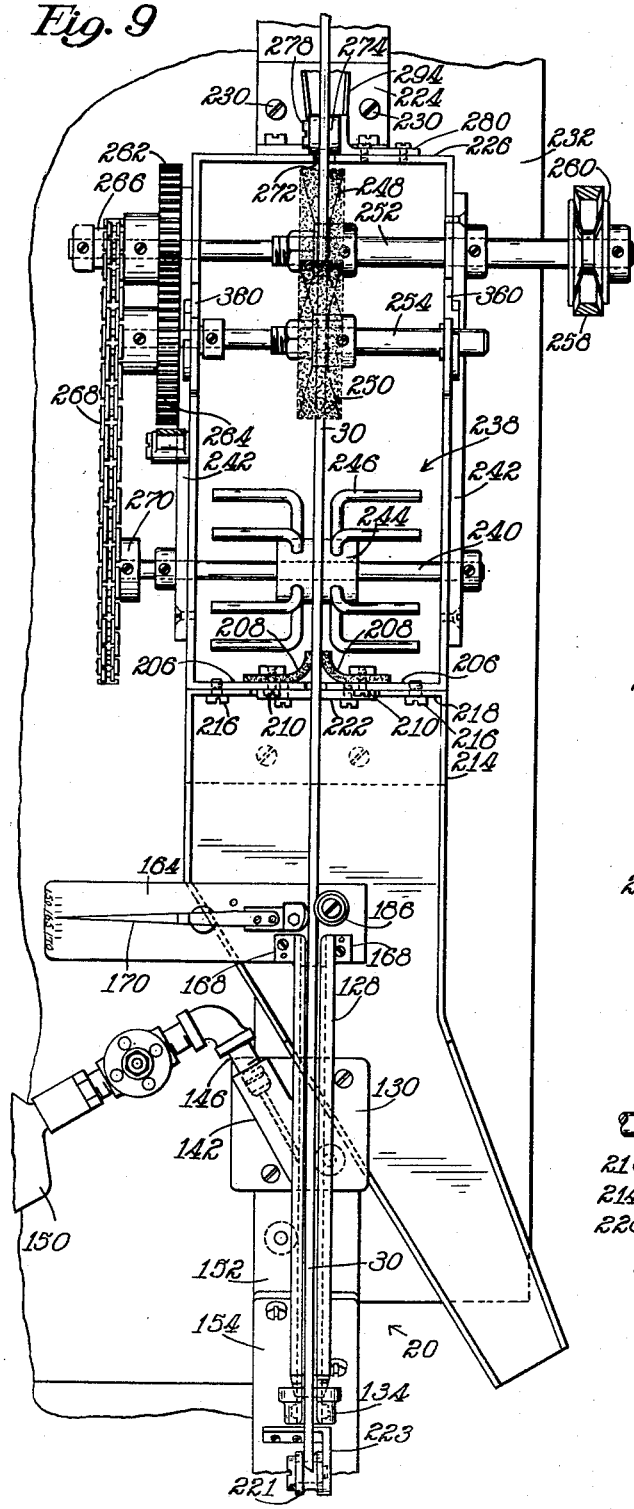
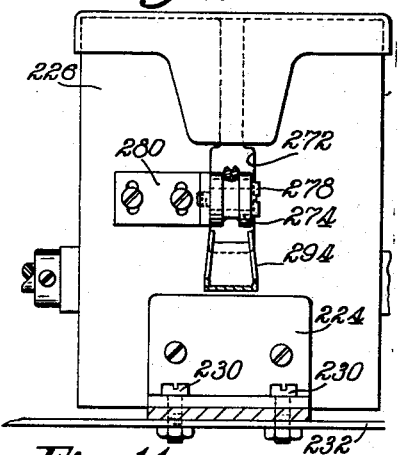
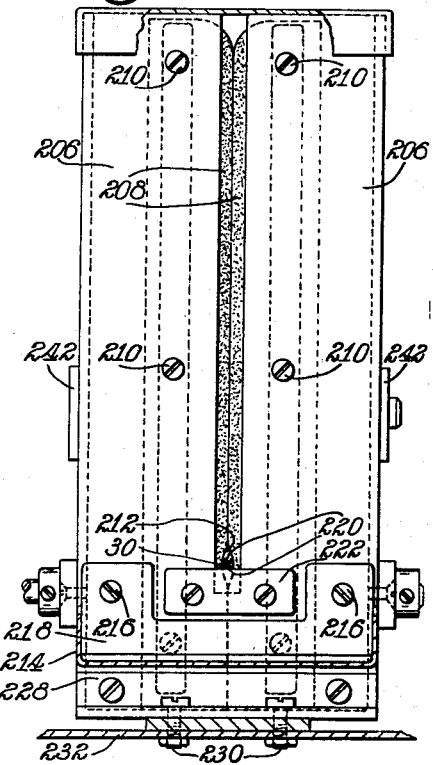
*Inventor*
Hans C. Paulsen
By his Attorney Nov. 29, 1960  H. C. PAULSEN  2,961,992
MEANS FOR COATING FLEXIBLE ROD SHAPED MATERIAL
Filed June 29, 1956  6 Sheets-Sheet 6
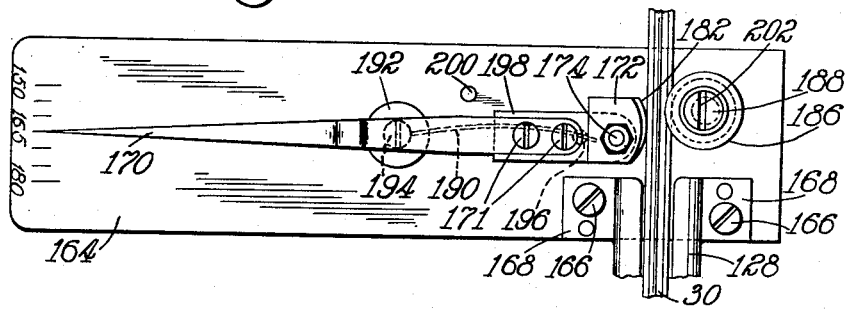
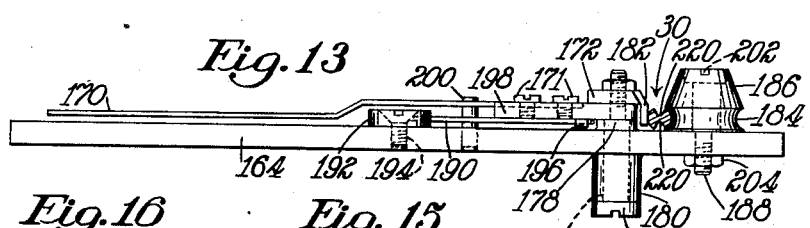
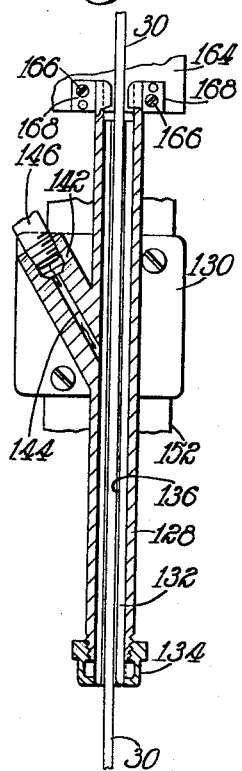
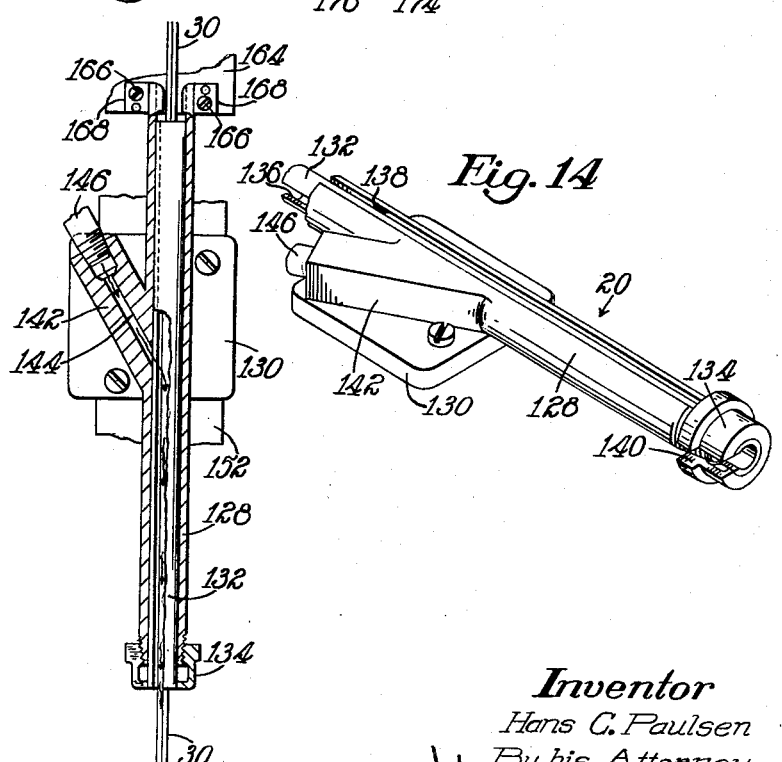
Inventor
Hans C. Paulsen
By his Attorney United States Patent Office 2,961,992
Patented Nov. 29, 1960

2,961,992
MEANS FOR COATING FLEXIBLE ROD SHAPED MATERIAL

Hans C. Paulsen, Medford, Mass., assignor to B. B. Chemical Co., Boston, Mass., a corporation of Massachusetts Filed June 29, 1956, Ser. No. 594,728

6 Claims. (Cl. 118—68)

This invention relates to means for treating a length of material during its passage from a processing means to a packaging operation and is herein illustrated in its application to means for coating a length of flexible rod shaped material, for example, by the application of powder thereto.

In the packaging of rod cement such, for example, as that employed in the bag top sealing machine, disclosed in United States Letters Patent No. 2,700,260, granted January 25, 1955, on an application filed in the name of Hans C. Paulsen, it has been found desirable to coat the rod with powder such, for example, as talc, in order to prevent contiguous windings from adhering to each other in the carton or on the reel, as the case may be.

It is an object of the present invention to provide suitable means for coating a length of material such, for example, as rod cement during its passage from the final processing operation to the packaging operation.

It is a further object of the invention to provide means for accelerating the evaporation of moisture from a length of material as it passes from a wet processing operation to a chamber which contains powder, such, for example, as talc through which the material is drawn to provide a coating thereon.

For accelerating the evaporation of moisture from a length of material, the present invention contemplates the provision of a drier through which the material is drawn on its way to the talc chamber.

The drier comprises two coaxial tubes mutually contiguous along cylindrical surfaces thereof and provided with mutually registerable longitudinal slots conterminous with the tubes through which slots an endless length of material is inserted into the inner tube when the slots are in mutual registration. To provide for the passage of air through the tubes the outer tube is provided with a port which is brought into registration with the slot in the inner tube by relative rotation of the tubes after the insertion of a length of material into the inner tube, said port being connected to a source of compressed air.

The powder chamber is constructed to receive an endless length of material to be coated. The chamber has mounted therein a powder agitator and a rotary brush positioned above the surface of the powder. Mechanism, including a rotor and suitable guide means cooperating therewith, draw and direct the material through the chamber in contiguous relation to the agitator and to the brush. The mechanism which draws the material through the chamber also operated a means for actuating the agitator and brush.

Suitable means is provided for orienting the length of material to present a selected powder bearing surface thereof to the brush for the removal of excess powder therefrom. The orienting means also serves to prevent torsional movement of the length of material during its passage through the drier and through the chamber.

These and other features of the invention will now be described with reference to the accompanying drawings and pointed out in the appended claims.

In the drawings,

Fig. 1 is a left side elevation illustrating a machine embodying the features of the present invention;

Fig. 2 is a left side elevation illustrating a portion of the mechanism shown in Fig. 1 in a position different from that illustrated in Fig. 1;

Fig. 4 is a plan view;

Fig. 5 is a left side elevation, partly in section, illustrating portions of the machine;

Fig. 6 is an enlarged perspective view illustrating a portion of the electric motor which operates the machine and mechanism associated with the motor;

Fig. 7 is a view in left side elevation illustrating the motor and mechanism associated therewith in a position different from that shown in Figs. 5 and 6;

Fig. 8 is a front elevation illustrating certain parts shown in Fig. 5;

Fig. 9 is a plan view of a powder chamber incorporated in the machine and certain associated mechanisms;

Fig. 10 is a rear view of the powder chamber;

Fig. 11 is a front view of the powder chamber;

Fig. 12 is an enlarged detail view of rod measuring mechanism incorporated in the machine;

Fig. 13 is a front view of the mechanism illustrated in Fig. 12;

Fig. 14 is an enlarged perspective view of a drier through which the length of material is drawn;

Fig. 15 is a plan view of the drier, partly in section, in a plan common to its longitudinal axis; and Fig. 16 is a view similar to Fig. 15 showing the parts of the drier in a relative position different from that shown in Fig. 15.

Figure 3:
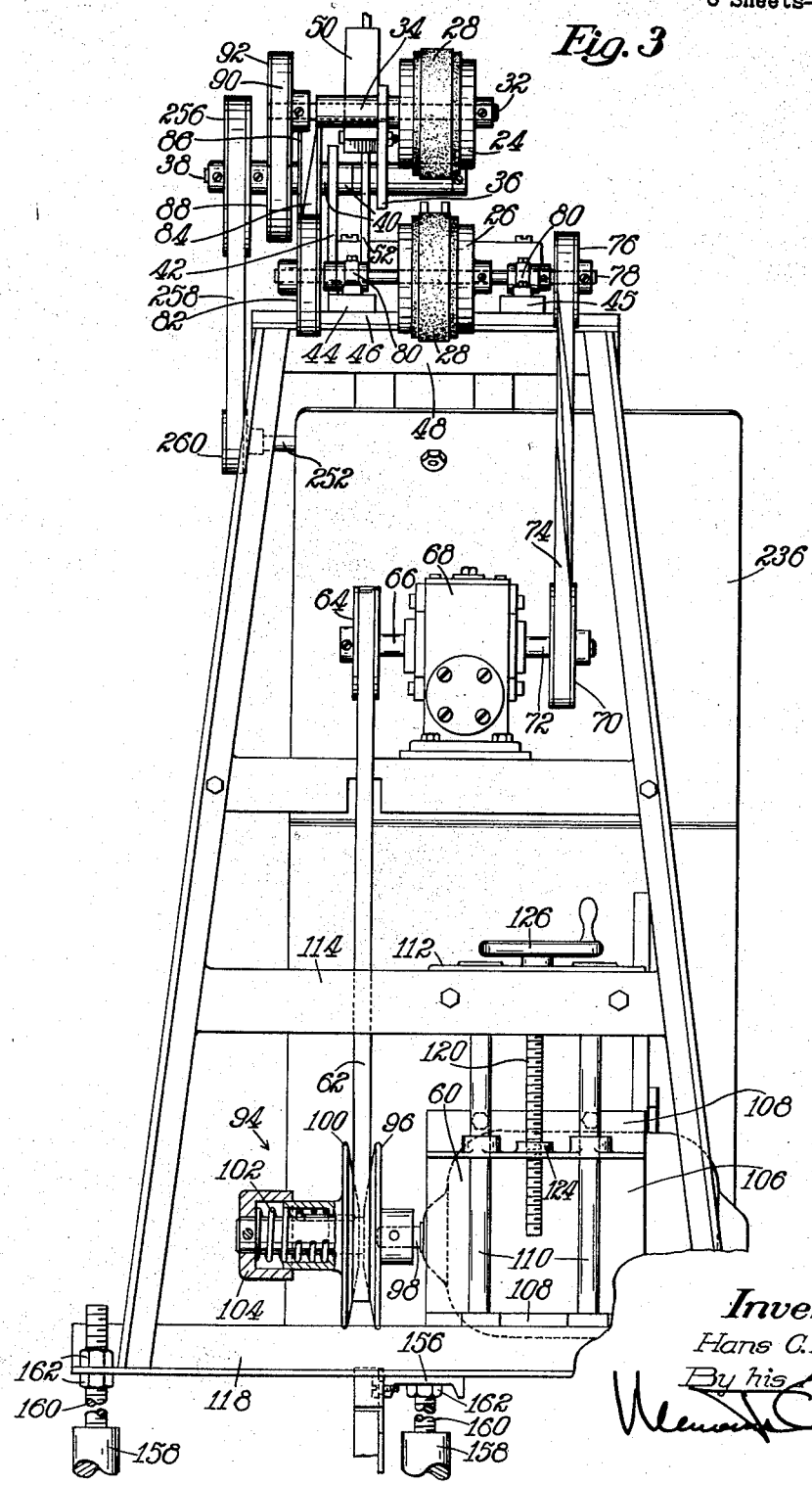
Fig. 3 is a rear elevation of the machine.

Referring to Fig. 1, the illustrated machine is constructed and arranged to handle lengths of flexible plastic material in rod shapes ranging in diameter from one eighth of an inch to one quarter of an inch. The plastic material, hereinafter referred to as the rod, is conducted to the machine from a quenching bath in which it has been solidified after having been extruded through a suitable die. While the greater part of the water which the rod carries with it from the quenching bath is removed by wiping mechanism at the egress end of the quenching tank, more or less moisture is retained by the rod as it approaches the illustrated machine. In order to insure the elimination of such moisture from the rod preparatory to the application of powder thereto, the present machine is equipped with a suitable drier 20 through which the rod is drawn prior to its entry into a chamber 22 where the rod is coated with powdered talc or other powder suitable for coating the rod in order to prevent the adhesion of contiguous portions thereof in packaging. For drawing the rod through the drier 20 and the chamber 22 a pair of power driven rotors 24 and 26 are constructed and arranged to engage the rod frictionally between them. The rotors receive equal and opposite movement in a direction to draw the rod through the drier 20 and the chamber 22 as it is fed from the quenching bath and to advance it to a winding means whereby it is wound on suitable reels or the like for shipment.

Referring to Fig. 3 the rotors 24 and 26, which are of duplicate construction, each comprises a cylindrical band 28 of material such, for example, as rubber, which is characterized by its capacity to feed a length of plastic rod shaped material by frictional engagement therewith. The band is secured to a cylindrical rotor 29 fixed to a power driven shaft.

To provide for the introduction between the rotors 24 and 26 of a length of rod such, for example, as the rod 30, illustrated in Fig. 1, the rotor 24 is arranged for movement away from the rotor 26 into its position illlustrated in Fig. 2. To this end the rotor 24 is fixed to a shaft 32 which is mounted in a bearing in a cylindrical boss 34 (Fig. 4) at the free end of an arm 36 which is freely mounted for vertical swinging movement on a shaft 38 fixed in a suitable boss 40 at the upper end of a standard 42 fixed to a narrow plate or rail 44. As shown in Figs. 1 and 3, the rail 44 and a like rail 45 are fixed to a crosshead 46 secured to a horizontal angle iron 48 at the upper extremity of a structure constituting the main portion of the frame of the machine. In order to enable the rotor 24 to apply sufficient pressure to the rod 30 by gravity a suitable weight herein illustrated as a mental block 50 is secured to the arm 36 near its free end. In order to facilitate the retraction of the rotor 24 into its elevated position illustrated in Fig. 2 a hand lever 52 is fulcrumed at 54 on the arm 36 and has its rounded lower end arranged to bear against the rail 44 during movement of the lever in a counterclockwise direction, as seen in Fig. 1. In its rest position, illustrated in Fig. 1, the hand lever 52 is positioned by its engagement with a pin 56 mounted in the arm 36 and in its operative position, illustrated in Fig. 2, the hand lever is positioned by its engagement with a shaft 58 hereinafter described. For driving the rotor 26 in a counterclockwise direction, as seen in Fig. 1, the illustrated machine is provided with an electric motor 60 which is connected by a transmission belt 62 to a pulley 64 (Fig. 3) fixed to the input shaft 66 of a speed reduction unit 68. A pulley 70 fixed to the output shaft 72 of the speed reduction unit is connected by a transmission belt 74 to a pulley 76 fixed to a shaft 78 to which the rotor 26 is secured. As shown in Fig. 3, the shaft 78 is journaled in suitable bearing brackets 80 fixed to the rails 44 and 45 respectively. For rotating the rotor 24 in a clockwise direction, as seen in Fig. 1, a pulley 82 (Fig. 4) is secured to the right end portion of the shaft 78 and is connected by a transmission belt 84 to a pulley 86 mounted to rotate freely on the shaft 38 on which, it will be remembered, the arm 36 is also mounted. Mounted on the same hub as the pulley 86 is a pulley 88 of the same diameter which is connected by a transmission belt 90 to a pulley 92 fixed to the right end portion of the shaft 32 on which the rotor 24 is mounted. The belt 84 is crossed, as shown in Fig. 1, in order to impart opposite rotation to the pulley 86 and through the pulley 88 and the belt 90 to the pulley 92 on the shaft 32 of the rotor 24. In order to impart equal rotation to the rotors 24 and 26 the pulleys 88 and 92 have a common diameter as do also the pulleys 82 and 92.

In order to provide for the adjustment of the speed of rotation of the rotors 24 and 26 in accordance with variations in the feed of the rod 30 from the quenching bath of the extruding assembly the motor 60 transmits power to the belt 62 through a variable speed pulley 94 (Fig. 3) the effective diameter of which is altered by a vertical adjustment of the motor. The pulley 94, which is constructed in accordance with United States Letters Patent No. 2,140,942, granted December 20, 1938, on an application filed in the names of Reeves et al., comprises a frustoconical disk 96 fixed to the motor shaft 98 and a similar frusto-conical disk 100 splined to an extension of the hub of the disk 96. The disk 100 is urged toward the disk 96 by a spring 102 surrounding the hub of the disk 100 and confined between said disk and a collar 104 on the motor shaft. In order to provide for vertical adjustment of the motor 60 as required to vary the effective diameter of the pulley 94 the base 106 of the motor has secured thereto two brackets 108 (Fig. 1) respectively characterized by the formation therein of two cylindrical bosses bored for sliding movement upon two parallel vertical shafts 110. As shown in Figs. 1 and 3 the shafts 110 are mounted at their upper ends in a bracket 112 fixed to a horizontal rail 114 of the superstructure and at their lower ends the two shafts are mounted in a bracket 116 fixed to a horizontal angle iron 118. For imparting vertical movement to the motor assembly and for holding it in its adjusted position a screw shaft 120 is journaled at its upper end in a bearing in an extension 122 of the bracket 112 and has threaded engagement in an internally threaded boss 124 (Fig. 3) on the bracket 108. The screw shaft 120 is operated by a hand wheel 126 fixed to its upper end. If desired, a pointer and scale may be provided for indicating the vertical adjustment of the motor assembly.

Referring to Figs. 14, 15 and 16, the illustrated rod drying assembly comprises an outer tube 128 which is welded to a plate 130 and has mounted therein a tube 132 which is held in position within the outer tube by friction but is nevertheless rotatable between its position in Fig. 16 and its position illustrated in Fig. 15. To facilitate the rotation of the inner tube 132 a collar 134 is secured to a forward portion thereof projecting from the outer tube and the collar is internally threaded for engagement with the externally threaded forward end portion of the outer tube 128. It will be understood that the threaded engagement of the collar 134 with the outer tube determines the position of the inner tube longitudinally of the outer tube and prevents inadvertent longitudinal movement of the inner tube. To facilitate the insertion of a length of rod, such for example as the rod 30, into the drier assembly the inner tube 132 is rotated into its position illustrated in Fig. 16 in which a slot 136 extending the full length of the inner tube registers with a like slot 138 (Fig. 14) extending the full length of the outer tube. As shown in Fig. 14 the collar 134 is provided with a longitudinal slot 140 to complete the opening through which the rod is inserted into the inner tube 132. After the rod is so inserted the inner tube is turned 90° into its position illustrated in Fig. 14 in order to close the opening and thus to provide a complete cylindrical closure about the rod 30. Formed integrally with the outer tube 128 is an arm 142 which is disposed at an angle of approximately 30° to that portion of the outer tube extending rearwardly from its junction with the arm. The arm is preferably square in cross section and arranged in contiguous relation to the surface of the plate 130 to which it may conveniently be secured, for example, by welding. A bore 144 of relatively small diameter extending longitudinally of the arm 142 communicates with the interior of the outer tube 128 and when the inner tube 132 is in its position illustrated in Fig. 14 the bore 144 communicates through the slot 136 with the interior of the inner tube. The end of the arm 142 is counterbored and threaded to receive the threaded end portion of a tube 146. Referring to Fig. 1, the tube 146 is part of a conducting system whereby compressed air delivered by a blower or pump 148 through a suitable filter 150 forces a blast of dry air through the bore 144 and through the inner tube 132 in order to accelerate the evaporation of such moisture, if any, as is still retained on the rod 30 when it enters the tube, thus to insure the entry of the rod into the chamber 22 in a dry condition. As shown in Fig. 1, the plate 130 to which the outer tube 128 is secured is attached to the inclined portion of a bent plate 152, the vertical lower end portion of which is secured to the upper end portion of a standard 154 secured to the upper surface of a horizontal channel member 156. The channel member, which comprises one element of the base portion of the superstructure, is secured at its rear end to the central portion of the angle iron 118. The forward portion of the channel member is extended beyond the standard 154 to receive one of three legs supporting the frame. The legs, which are of like construction, each comprises a cylindrical foot 158 having mounted therein and extending upwardly therefrom a threaded stem 160 which carries two nuts 162 whereby the effective length of the leg may be adjusted. As shown in Fig. 1, the stem of the forward leg extends through a bore in the extension of the channel member 156 and the stems of the rear legs extend through bores in the end portions of the angle iron 118.

In order to enable the operator to make a quick reading of the diameter of the rod as it passes from the drying assembly to the chamber 22 a measuring means, illustrated in Figs. 12 and 13, is provided. This mechanism comprises an indicator arranged to register with a plate 164 on which a scale is inscribed. The plate is secured by headed screws 166 to ears 168 extending in opposite directions from the egress end portion of the tube 128. The indicator or pointer comprises a relatively thin finger 170 secured by headed screws 171 in a suitable recess in an extension 198 of a head 172 to which is secured a bolt 174 having an elongated cylindrical shank portion 176 mounted to turn freely in a bore extending through the plate 164 and through alined bosses 178 and 180, respectively above and below the plate. An arcuate flange 182 projecting downwardly from the head 172 is arranged to engage the rod 30. The flange is eccentric to the bolt 174 and its center of curvature is so located that movement of the pointer 170 in a clockwise direction, as seen in Fig. 12, urges the rod to the right and holds the rod against a complementally shaped groove 184 formed in a rotor 186 pivotally mounted on the elongated shank portion of a bolt 188 secured to the plate 164. The pointer 170 is urged in a clockwise direction, as seen in Fig. 12, by a spring 190 the left end portion of which is anchored in a disk 192 secured by a headed screw 194 to the plate 164 and the right end portion of which is slidably mounted in a diametrical bore in a cylindrical pin 196 swiveled in the extension 198. The disk 192 is adjusted, as shown in Fig. 12, to flex the spring 190 in a direction to impart clockwise movement to the pointer 170. The pressure of the spring 190 against the pointer is only sufficient to insure the pressure of the flange 182 against the rod required to maintain contact of the rod with the rotor 186 but not sufficient to cause any distortion of the rod by the pressure of the flange against it. When there is no rod present between the flange of the pointer and the rotor 186. the pointer is held by the spring 190 in contact with a pin 200 mounted in the plate 164. In order to permit adjustment of the indicating mechanism to correct the registration of the pointer with the scale as required, the bolt 188 has its head and shank portion eccentrically arranged relatively to the threaded portion thereof, as shown in Fig. 13, and the head has a screw-driver slot 202 to facilitate the turning of the bolt after first loosening the nut 204 which clamps the bolt to the plate 164.

From the measuring mechanism the rod advances into the chamber 22 where it is coated with powdered talc in order to prevent adhesion between contiguous convolutions of the rod on the reel. Referring to Fig. 5, the chamber 22, because of its inclination, requires a forward wall which is substantially higher than its rear wall in order to provide a chamber capable of receiving an adequate supply of powder without danger of overflow from the low portion of its rim. To the same end the side walls of the chamber diverge forwardly and downwardly from their central portions so that their forward edges are coextensive with the forward wall of the chamber. Referring to Fig. 11, the forward wall of the chamber comprises two plates 206 having their inner edges spaced from each other to provide for the ingress of the rod 30. Referring to Fig. 9, the space between the plates 206 is closed by two flat strips 208 of flexible material such, for example, as vulcanized rubber, which are secured by bolts 210 to the inner surfaces of the plates 206. As shown in Fig. 9, the adjacent margins of the strips 208 are bent inwardly. The tendency of the strips 208 to return to their normal flat condition normally holds their inner margins in contiguous relation to each other while permitting the rod to spread the strips apart locally, as shown in Fig. 11, to permit its ingress into the chamber. Inasmuch as some powder is lost from the chamber through the opening 212 formed by the rod a suitable trough 214 is provided for conducting the powder which leaks through the opening to a suitable receptacle (not shown). As shown in Fig. 9, the trough is secured to the plates 206 by two screws 216 extending through the end wall 218 of the trough.

As shown in Fig. 11, the rod 30 has oppositely disposed longitudinal grooves 220. In order to insure a proper orientation of the grooves at the measuring point, as shown in Fig. 13, the rod passes over a guide roll 221 (Fig. 9) near the ingress end of the drier 20, said roll being mounted on a bracket 223 fixed to the standard 154. The guide roll insures a disposition of the rod with the grooves vertically disposed, as shown in Fig. 13, by the provision in the roll of a groove having a cylindrical base which provides a bearing surface for the edges defined by the walls of one of the grooves 220 and the adjacent cylindrical surfaces of the rod. To the same end a plate 222 (Fig. 11) is secured to the plates 206 in a position such that its horizontal upper edge is engaged by said edges of the rod 30 as it advances into the chamber 22. To provide for the mounting of the chamber a bracket 224 (Fig. 10) is secured to the rear wall 226 of the chamber and a bracket 228 (Fig. 11) is secured to the plates 206. The two brackets are secured by headed screws 230 to an inclined plate 232 (Fig. 5) which is secured at its upper end to the angle iron 48 and at its lower end is secured by suitable rivets to the plate 152 in spaced relation to the plate 152 determined by tubular spacers 234 through which the rivets extend. In order to obviate, in so far as possible, the accumulation of powder on the operating parts below the chamber 22, a shield in the form of a plate 236 is secured to the bottom surface of the plate 232 and has a vertical section extending downwardly from the lower extremity of the plate 232.

In order to provide for the agitation of the powder, particularly along the path of movement of the rod 30, a suitable agitator 238 (Fig. 9) is fixed to a rotary shaft 240 mounted in bearings in plates 242 secured to the side walls of the chamber. The illustrated agitator comprises a hub 244 having two sets of angular fingers projecting radially therefrom at regular intervals about its periphery, one of said fingers being identified in Fig. 9 by the numeral 246.

To provide for the elimination of excess powder from the rod 30, and particularly from the grooves 220 formed therein, two rotary bristle brushes 248 and 250 are arranged near the rear wall 226 of the chamber, the brush 248 being located below the rod 30 and the brush 250 above. In order to insure a vertical disposition of the grooves in the rod thus permitting the cleaning of the grooves by the brushes a guide roll 274 (Fig. 10) is provided. The illustrated guide roll is arranged adjacent to an egress opening, herein illustrated as an open ended slot 272 in the rear wall 226 of the chamber, said guide roll, like the guide roll 221 shown in Fig. 9, being characterized by a groove having a cylindrical base which provides a bearing surface for the edges defined by the walls of one of the grooves 220 and the adjacent cylindrical surfaces of the rod. In order that the brush 250 will be substantially free of accumulated powder when it comes into contact with the rod 30, a suitable brush cleaning device herein illustrated as a rigid finger 298 (Fig. 5) is secured to the inner or bottom surface of a cover 300 removably mounted on the upper portion of the chamber 22. The finger 298 has an end portion which is bent downwardly into a position in which it is engaged by the ends of the bristles of the brush as the brush rotates, thus causing flexure of the bristles followed by a spring back into normal position which eliminates from the brush the greater part of such powder as may be accumulated in the bristles. The guide roll 274 which positions the rod 30 relatively to the brushes is mounted, as shown in Fig. 10, to rotate freely on the shank portion of a headed screw 278 secured to a bracket 280 attached to the rear wall 226. The two rotary bristle brushes 248 and 250 are secured, respectively, to shafts 252 and 254 journaled in bearings in the side walls of the chamber. The two brushes and the agitator 238 are actuated by a pulley 256 (Fig. 4) which is mounted on a common hub with the pulleys 286 and 288. As shown in Fig. 1, the pulley 256 is connected by a transmission belt 258 with a small pulley 260 (Fig. 9) secured to an extension of the shaft 252. To provide for equal and opposite movement of the two brushes 248 and 250 a spur gear 262 fixed to the left end portion of the shaft 252 meshes with a spur gear 264 (Fig. 1) fixed to the shaft 254. To provide for the operation of the agitator 238, a sprocket 266 fixed to the shaft 252 is operatively connected by a chain 268 to a relatively large sprocket 270 fixed to the agitator shaft 240. From the guide roll 274 the rod advances to a relatively large guide roll 282 where the inclination of the rod is altered, as shown in Fig. 1, for the short run from the guide roll 282 to the rotors 24 and 26. As shown in Fig. 4, the guide roll 282 is freely mounted on the shaft 58 and is centrally disposed thereon between two collars 284. In order to insure a disposition of the rod substantially centrally widthwise of the rotor 26 two vertical guide plates 286 are arranged adjacent to and at opposite sides of the rod 30 just in advance of the rotor 26. As shown in Fig. 4, the guide plates 286 extend upwardly from a crosshead 288 secured by headed screws 290 to the upper end surfaces of bosses 292 projecting upwardly from the rails 44 and 45, respectively. During its passage from the guide roll 274 to the guide roll 282 the rod 30 is located above an inclined trough 294 which receives any powder which falls from the rod or from either of the rotors and conducts it back into the chamber 22. At its forward end the trough is secured, for example by welding, to the rear wall 226 of the chamber, and near its rear end the trough has welded thereto a horizontal plate 296 (Fig. 4) which is secured to the crosshead 46.

Inasmuch as it is not practicable to synchronize the rotors 24 and 26 which advance the rod 30 with the means for drawing the rod from the quenching bath of the extruding assembly, suitable means is provided in the illustrated organization for automatically regulating the speed of the motor 60 so that the rotors 24 and 26 operate alternately faster and slower than the means for drawing the rod from the quenching bath thus alternately tautening and slackening the approaching portion of the rod, that is, the portion between the extruding assembly and the guide roll 221 illustrated in Fig. 5. The position of the approaching portion of the rod at the end of the tautening operation is illustrated by broken lines in Fig. 5, and its position at the end of the slackening operation is illustrated by full lines in Fig. 5. In the illustrated organization the speed regulation is effected by an adjustment of the motor brush assembly by angular movement of a shifter, herein illustrated as an arm 302 (Fig. 6) projecting radially from a brush casing 304 through a peripheral slot 306 in the outer casing 308 of the motor. The speed of operation of the motor is increased by the contraction of a spring 310 which swings the arm 302 upwardly into its position illustrated in Fig. 6. As shown in Fig. 1, the lower end of the spring 310 is anchored to the outer end portion of the arm 302 and the upper end portion of the spring is anchored to a headed screw 312 mounted in a vertical plate 314 secured to the outer casing of the motor by screws 316, the central portion of the plate being recessed, as shown in Fig. 1, to permit the attachment thereof to the casing. The motor is shifted to low speed by the operation of a solenoid 318 which is connected to the arm 302 by a stem 320 threaded into a tapped hole in a boss 321 projecting from the plunger 322 of the solenoid, said stem having at its upper end a yoke 324 which is pivotally connected to the arm 302. The solenoid is fixed to an angularly disposed flange 323 at the lower end of a plate 325 secured by screws 327 to the upright plate 314 fixed to the motor casing. Thus it will be seen that the solenoid moves with the motor assembly during its adjustment by the screw 120 and remains at all times in fixed relation to the motor. The solenoid is activated by the operation of a switch 326 to swing the arm 302 downwardly from its position in Fig. 5 into its position illustrated in Fig. 7, thus reducing the speed of operation of the motor. The illustrated switch comprises a flat angle plate 328 mounted to rock on a fixed fulcrum 330. The angle plate 328 has fixed in its upper end portion a closed tube 336 containing conducting fluid such, for example, as mercury. When the switch is swung into its position indicated by broken lines in Fig. 5 the fluid flows into the right end portion of the tube and closes a circuit between the wires of an electrical conductor 338. For rocking the switch 326 between its full line position and its broken line position illustrated in Fig. 5 a link 340 is pivotally mounted at the rear end of the angle plate 328 and has its lower end portion arranged to extend through an opening 342 in a lever herein illustrated as a length of angle iron 344 mounted to swing on a fixed fulcrum 346. Mounted to rotate freely on a headed screw 348 at the forward end of the lever 344 is a pulley 350 which is engaged by the rod 30 during its passage from the extruding assembly to the illustrated machine. When the motor 60 is operating at high speed the slack in the rod 30 is reduced and the rod is tautened thereby elevating the pulley 350 and swinging the lever 344 into its broken line position illustrated in Fig. 5. During its upward movement the lever 344 engages a collar 352 fixed to the link 340 and swings the switch assembly 326 into its broken line position illustrated in Fig. 5, thus closing the circuit to the solenoid 318. The operation of the solenoid swings the arm 302 downwardly and thus adjusts the motor 60 for operation at low speed. During such operation of the motor the slack in the rod 30 increases and the lever 344 swings downwardly. During such downward movement the lever engages a collar 354 secured to the lower end portion of the link 340 thereby rocking the switch assembly 326 into its full line position illustrated in Fig. 5 and thus opening the circuit to the solenoid. Thereupon, the spring 310 swings the arm 302 upwardly into its position illustrated in Fig. 5 to shift the motor 60 to the high speed cycle. In the illustrated organization the position of the arm 302 at the limit of its upward movement is determined by the engagement of the yoke 324 with a bracket 356 fixed to the plate 314. Upon the return of the motor to its high speed cycle the upward movement of the lever 344 above described is repeated. It will be understood that the shifting of the motor between high speed and low speed continues at fairly regular intervals during the entire operation of the machine.

When it is desired to insert a new length of rod into the machine the rotors 24 and 26 are separated from each other by shifting the hand lever 52 into its position illustrated in Fig. 2, then removing the cover 300 from the chamber 22 and turning the inner tube 132 (Fig. 14) of the drier into its position of alinement with the slot in the outer tube 128. Thereupon the rod which, at this time is being continuously fed from the extruding assembly, is quickly positioned upon the rotor 26 then inserted between the guide plates 286 (Fig. 4) and brought into engagement with the guide roll 282. The rod is then moved downwardly through the open-ended slot 272 (Fig. 10) in the rear wall 226 of the chamber 22 and brought into engagement with the guide roll 274. In like manner the rod is moved downwardly between the rubber strips 208 (Fig. 11) in the front wall of the chamber and brought into engagement with the upper edge face of the plate 222, care being taken to insure a vertical disposition of the grooves in the rod, as shown in Fig. 13. The rod is then inserted into the measuring device and the drier 20 and finally is positioned on the guide roll 221 and beneath the pulley 350, as shown in Fig. 5. Thereupon, the hand lever 52 is returned to its position illustrated in Fig. 1, thus rendering the rotors 24 and 26 effective to advance the rod 30 through the rod handling instrumentalities. The cover 300 is then replaced on the chamber 22. In order to facilitate the location of the rod 30 with reference to the brushes 248 and 250 in the talc chamber the upper brush 250 is constructed and arranged for convenient removal from the chamber. To that end the side walls of the chamber are provided with open ended slots 360 (Figs. 5 and 9) and these slots are inclined downwardly and forwardly relatively to the plane of the base of the chamber so that the driven brush shaft 252, operating in a clockwise direction as seen in Fig. 5, urges the upper brush assembly downwardly and holds the shaft 254 seated at the ends of the slots. In order to bring the air pressure supply into communication with the passageway in the drier 20 the inner tube 132 is rotated 90° into its position illustrated in Fig. 14 after the introduction of the rod into the drier. Such rotation of the inner tube closes the longitudinal opening in the top of the drier and brings the passageway through the drier into communication with the bore 144 (Fig. 15) in the arm 142, thus permitting the flow of air through the drier. After positioning the rod 30 relatively to the operating instrumentalities, as above described, the machine proceeds automatically and continuously without the aid of an operator.

Having thus described my invention, what I claim as new and desire to secure by Letters Patent of the United States is:

1. In combination, a powder chamber, means for drawing a length of adhesive material through the powder chamber, a drier through which the length of adhesive material is drawn on its way to the powder chamber, said drier comprising two coaxial tubes mutually contiguous along cylindrical surfaces thereof and arranged for relative rotation on their common axis, said tubes being characterized by mutually registrable longitudinal slots conterminous with the tubes, the outer tube being characterized by a port registrable with the slot in the inner tube to provide a passageway from said port to the center of the inner tube, and means for delivering a stream of air through the drier.

2. In combination, a drier comprising an inner tube and an outer tube which are both coaxial and mutually contiguous along cylindrical surfaces thereof, said tubes being characterized by mutually registrable longitudinal slots, the outer tube being characterized by a port offset circumferentially from the slot in the outer tube and registrable with the slot in the inner tube to provide a passageway through the port and the slot in the inner tube into the axial opening in the inner tube, means for coating a length of material drawn through the drier, and means for drawing such a length of material through the drier and the coating means.

3. In combination, a powder chamber constructed to receive an endless length of material to be coated with powder, a powder agitator positioned below the surface of the powder in the chamber, a rotary brush positioned above the surface of the powder, mechanism including a rotor and guide means cooperative therewith for drawing the length of material through the chamber in contiguous relation to the agitator and to the brush, and means operated by said mechanism for actuating the agitator and the brush.

4. In combination, a powder chamber constructed to receive an endless length of material to be coated with powder, a rotary brush positioned above the surface of the powder in the chamber, a rotor for drawing the length of material through the powder in the chamber to acquire a coating and then in contiguous relation to the brush, and means for orienting the length of coated material thereby to present a selected powder bearing surface thereof to the brush for the removal of excess powder.

5. In combination, a powder chamber constructed to receive an endless length of material to be coated with powder, a rotary bristle brush positioned above the surface of the powder in the chamber, a rotor for drawing the length of material through the powder in the chamber to acquire a coating and then in contiguous relation to the brush, means for orienting the length of coated material thereby to present a selected powder bearing surface thereof to the brush for the removal of excess powder, and means for causing flexure of the bristles of the brush thereby to effect the removal of powder therefrom.

6. In combination, a powder chamber, means for drawing a length of material through the chamber, a drier for preparing the length of material for the application of powder thereto, a first guide for the length of material positioned at the ingress side of the drier and constructed to maintain a selected surface of the length of material uppermost, and a second guide at the egress side of the chamber constructed to maintain a selected surface of the length of material uppermost, said guides cooperating to prevent torsional movement of the length of material during its passage through the drier and through the chamber.

References Cited in the file of this patent

UNITED STATES PATENTS

| | | |
|---|---|---|
| 686,521 | Larsen | Nov. 12, 1901 |
| 894,592 | Callan | July 28, 1908 |
| 1,177,967 | Schoenky | Apr. 4, 1916 |
| 1,187,008 | Nehring | June 13, 1916 |
| 1,285,384 | Reynolds | Nov. 19, 1918 |
| 1,710,747 | Smith | Apr. 30, 1929 |
| 1,740,029 | Moomy | Dec. 17, 1929 |
| 1,811,505 | Kennedy | June 23, 1931 |
| 1,957,270 | Keen et al. | May 1, 1934 |
| 2,003,267 | Smith et al. | May 28, 1935 |
| 2,069,087 | Forstrom et al. | Jan. 27, 1937 |
| 2,167,971 | Cadden | Aug. 1, 1939 |
| 2,283,014 | Reid | May 12, 1942 |
| 2,347,392 | Bouget | Apr. 25, 1944 |
| 2,375,971 | Windschauer | May 15, 1945 |
| 2,579,425 | George | Dec. 18, 1951 |
| 2,581,938 | Swanson et al. | Jan. 8, 1952 |
| 2,659,974 | Scudder | Nov. 24, 1953 |
| 2,700,260 | Paulsen | Jan. 25, 1955 |
| 2,726,922 | Merrill et al. | Dec. 13, 1955 |
| 2,750,921 | Purdy | June 19, 1956 |

FOREIGN PATENTS

| | | |
|---|---|---|
| 258,087 | Switzerland | May 2, 1949 |